US010860527B2

(12) United States Patent
Bono et al.

(10) Patent No.: US 10,860,527 B2
(45) Date of Patent: Dec. 8, 2020

(54) STORAGE MANAGEMENT SYSTEM AND METHOD (71) Applicant: EMC IP Holding Company, LLC, Hopkinton, MA (US)

(72) Inventors: Jean-Pierre Bono, Westboro, MA (US); Sudhir Srinivasan, Acton, MA (US); Marc A. De Souter, Wayne, NJ (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 203 days.

(21) Appl. No.: 15/971,582

(22) Filed: May 4, 2018

(65) Prior Publication Data
US 2019/0340258 A1    Nov. 7, 2019

(51) Int. Cl.
| G06F 16/11 | (2019.01) |
| H04L 29/08 | (2006.01) |
| G06F 3/06 | (2006.01) |
| G06F 16/14 | (2019.01) |
| G06F 16/16 | (2019.01) |
| G06F 16/185 | (2019.01) |
| G06F 16/18 | (2019.01) |

(52) U.S. Cl.
CPC ......... G06F 16/113 (2019.01); G06F 3/0643 (2013.01); G06F 16/148 (2019.01); G06F 16/162 (2019.01); G06F 16/185 (2019.01); G06F 16/1873 (2019.01); H04L 67/1097 (2013.01)

(58) Field of Classification Search
None
See application file for complete search history.

(56) References Cited

U.S. PATENT DOCUMENTS

| 5,764,972 | A | 6/1998 | Crouse et al. |
| 6,324,581 | B1 | 11/2001 | Xu et al. |
| 7,457,982 | B2 | 11/2008 | Rajan |
| 7,685,177 | B1 | 3/2010 | Hagerstrom et al. |
| 7,721,057 | B2 | 5/2010 | Berkowitz et al. |
| 8,312,231 | B1 | 11/2012 | Li et al. |
| 9,389,932 | B2 | 7/2016 | Fang |
| 9,635,132 | B1 | 4/2017 | Lin et al. |
| 10,019,180 | B1 | 7/2018 | Miah et al. |
| 10,339,182 | B2 | 7/2019 | Kim et al. |

(Continued)

OTHER PUBLICATIONS

Non-Final Office Action issued in U.S. Appl. No. 15/971,610 dated Sep. 17, 2019.

(Continued)

Primary Examiner — Richard L Bowen
(74) Attorney, Agent, or Firm — Brian J. Colandreo; Mark H. Whittenberger; Holland & Knight LLP (57) ABSTRACT A method, computer program product, and computing system for storing a plurality of identifiers on a local data storage system. The plurality of identifiers locate a plurality of archived files at a plurality of defined remote addresses on a remote data storage system. The deletion of at least one of the plurality of identifiers is sensed, thus defining at least one deleted identifier. Temporal information of the at least one deleted identifier is compared to temporal information for a data protection operation performed on at least a portion of the local data storage system.

15 Claims, 6 Drawing Sheets

(56) References Cited

U.S. PATENT DOCUMENTS

| | | |
|---|---|---|
| 10,740,192 B2 | 8/2020 | Bono |
| 2009/0319736 A1 | 12/2009 | Otani et al. |
| 2010/0088271 A1 | 4/2010 | Brixius et al. |
| 2010/0191783 A1 | 7/2010 | Mason et al. |
| 2010/0199042 A1 | 8/2010 | Bates et al. |
| 2010/0306283 A1 | 12/2010 | Johnson et al. |
| 2010/0332401 A1 | 12/2010 | Prahlad et al. |
| 2011/0191306 A1* | 8/2011 | Akagawa ............... G06F 16/162 707/692 |
| 2012/0016838 A1 | 1/2012 | Arai et al. |
| 2012/0079184 A1 | 3/2012 | Jaquette |
| 2013/0007219 A1 | 1/2013 | Sorenson, III et al. |
| 2013/0111171 A1 | 5/2013 | Hirezaki et al. |
| 2014/0006354 A1 | 1/2014 | Parkison et al. |
| 2014/0052689 A1 | 2/2014 | Ficara et al. |
| 2014/0108351 A1 | 4/2014 | Nallathambi et al. |
| 2014/0122428 A1 | 5/2014 | Zhou et al. |
| 2014/0181441 A1 | 6/2014 | Kottomtharayil et al. |
| 2014/0201150 A1 | 7/2014 | Kumarasamy et al. |
| 2014/0214899 A1 | 7/2014 | Ganapathy |
| 2015/0269213 A1 | 9/2015 | Avati |
| 2016/0063026 A1 | 3/2016 | Mokhtarzada et al. |
| 2016/0179826 A1 | 6/2016 | Batra |
| 2016/0210308 A1 | 7/2016 | Shekhar et al. |
| 2016/0212198 A1 | 7/2016 | Krishnasamy et al. |
| 2017/0185605 A1 | 6/2017 | Higuchi et al. |
| 2017/0249328 A1* | 8/2017 | Liang .................... G06F 16/182 |
| 2017/0262350 A1 | 9/2017 | Dornemann |
| 2017/0344618 A1 | 11/2017 | Horowitz et al. |
| 2018/0060062 A1 | 3/2018 | Sampson |
| 2018/0203865 A1 | 7/2018 | Srinivasan et al. |
| 2019/0095285 A1* | 3/2019 | McCormack ....... G06F 21/6218 |
| 2019/0108231 A1 | 4/2019 | Patterson |
| 2019/0213265 A1 | 7/2019 | Boerner et al. |
| 2019/0220528 A1* | 7/2019 | Cruciani ............... G06F 3/0649 |
| 2019/0235968 A1 | 8/2019 | Bono |
| 2019/0235972 A1 | 8/2019 | Bono |
| 2019/0238618 A1 | 8/2019 | Bono |

OTHER PUBLICATIONS

Final Office Action issued in related U.S. Appl. No. 15/971,610 dated Mar. 26, 2020.
Non-Final Office Action issued in related U.S. Appl. No. 15/971,544 dated Apr. 7, 2020.
Notice of Allowance issued in related U.S. Appl. No. 15/884,720 dated Apr. 21, 2020.
Non-Final Office Action issued in related U.S. Appl. No. 15/884,579 dated Jan. 14, 2020.
Non-Final Office Action issued in related U.S. Appl. No. 15/884,687 dated Jun. 11, 2020.
Non-Final Office Action issued in related U.S. Appl. No. 15/971,610 dated Jul. 8, 2020.
Notice of Allowance issued in related U.S. Appl. No. 15/884,579 dated Aug. 10, 2020.
Notice of Allowance issued in related U.S. Appl. No. 15/971,544 dated Sep. 8, 2020.

* cited by examiner

STORAGE MANAGEMENT SYSTEM AND METHOD

RELATED APPLICATION(S)

This application is related to: U.S. patent application Ser. No. 15/884,579 filed 31 Jan. 2018; Ser. No. 15/884,687 filed 31 Jan. 2018; and Ser. No. 15/884,720 filed 31 Jan. 2018, the entire contents of which are incorporated herein by reference.

TECHNICAL FIELD

This disclosure relates to storage management systems and, more particularly, to storage management systems that increase the efficiency of data storage operations.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to inherent limitations in some of the memory technology utilized in such storage systems, complex methodologies may need to be utilized in order to navigate around such inherent shortcomings.

SUMMARY OF DISCLOSURE

Orphan Management

In one implementation, a computer-implemented method is executed on a computing system and includes storing a plurality of identifiers on a local data storage system. The plurality of identifiers locate a plurality of archived files at a plurality of defined remote addresses on a remote data storage system. The deletion of at least one of the plurality of identifiers is sensed, thus defining at least one deleted identifier. Temporal information of the at least one deleted identifier is compared to temporal information for a data protection operation performed on at least a portion of the local data storage system.

One or more of the following features may be included. At least one archived data file associated with the at least one deleted identifier may be maintained if the temporal information of the data protection event predates the temporal information of the at least one deleted identifier. An archived data file associated with the at least one deleted identifier may be deleted if the temporal information of the at least one deleted identifier predates the temporal information of the data protection event. A local database, that defines the at least one deleted identifier, may be maintained on the local data storage system. Maintaining a local database, that defines the at least one deleted identifier, on the local data storage system may include maintaining the local database within a hidden directory on the local data storage system. The hidden directory on the local data storage system may be configured to include one or more hard links associated with the at least one deleted identifier. The remote data storage system may be a cloud-based data storage system In another implementation, a computer program product resides on a computer readable medium and has a plurality of instructions stored on it. When executed by a processor, the instructions cause the processor to perform operations including storing a plurality of identifiers on a local data storage system. The plurality of identifiers locate a plurality of archived files at a plurality of defined remote addresses on a remote data storage system. The deletion of at least one of the plurality of identifiers is sensed, thus defining at least one deleted identifier. Temporal information of the at least one deleted identifier is compared to temporal information for a data protection operation performed on at least a portion of the local data storage system.

One or more of the following features may be included. At least one archived data file associated with the at least one deleted identifier may be maintained if the temporal information of the data protection event predates the temporal information of the at least one deleted identifier. An archived data file associated with the at least one deleted identifier may be deleted if the temporal information of the at least one deleted identifier predates the temporal information of the data protection event. A local database, that defines the at least one deleted identifier, may be maintained on the local data storage system. Maintaining a local database, that defines the at least one deleted identifier, on the local data storage system may include maintaining the local database within a hidden directory on the local data storage system. The hidden directory on the local data storage system may be configured to include one or more hard links associated with the at least one deleted identifier. The remote data storage system may be a cloud-based data storage system In another implementation, a computing system includes a processor and memory is configured to perform operations including storing a plurality of identifiers on a local data storage system. The plurality of identifiers locate a plurality of archived files at a plurality of defined remote addresses on a remote data storage system. The deletion of at least one of the plurality of identifiers is sensed, thus defining at least one deleted identifier. Temporal information of the at least one deleted identifier is compared to temporal information for a data protection operation performed on at least a portion of the local data storage system.

One or more of the following features may be included. At least one archived data file associated with the at least one deleted identifier may be maintained if the temporal information of the data protection event predates the temporal information of the at least one deleted identifier. An archived data file associated with the at least one deleted identifier may be deleted if the temporal information of the at least one deleted identifier predates the temporal information of the data protection event. A local database, that defines the at least one deleted identifier, may be maintained on the local data storage system. Maintaining a local database, that defines the at least one deleted identifier, on the local data storage system may include maintaining the local database within a hidden directory on the local data storage system. The hidden directory on the local data storage system may be configured to include one or more hard links associated with the at least one deleted identifier. The remote data storage system may be a cloud-based data storage system The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
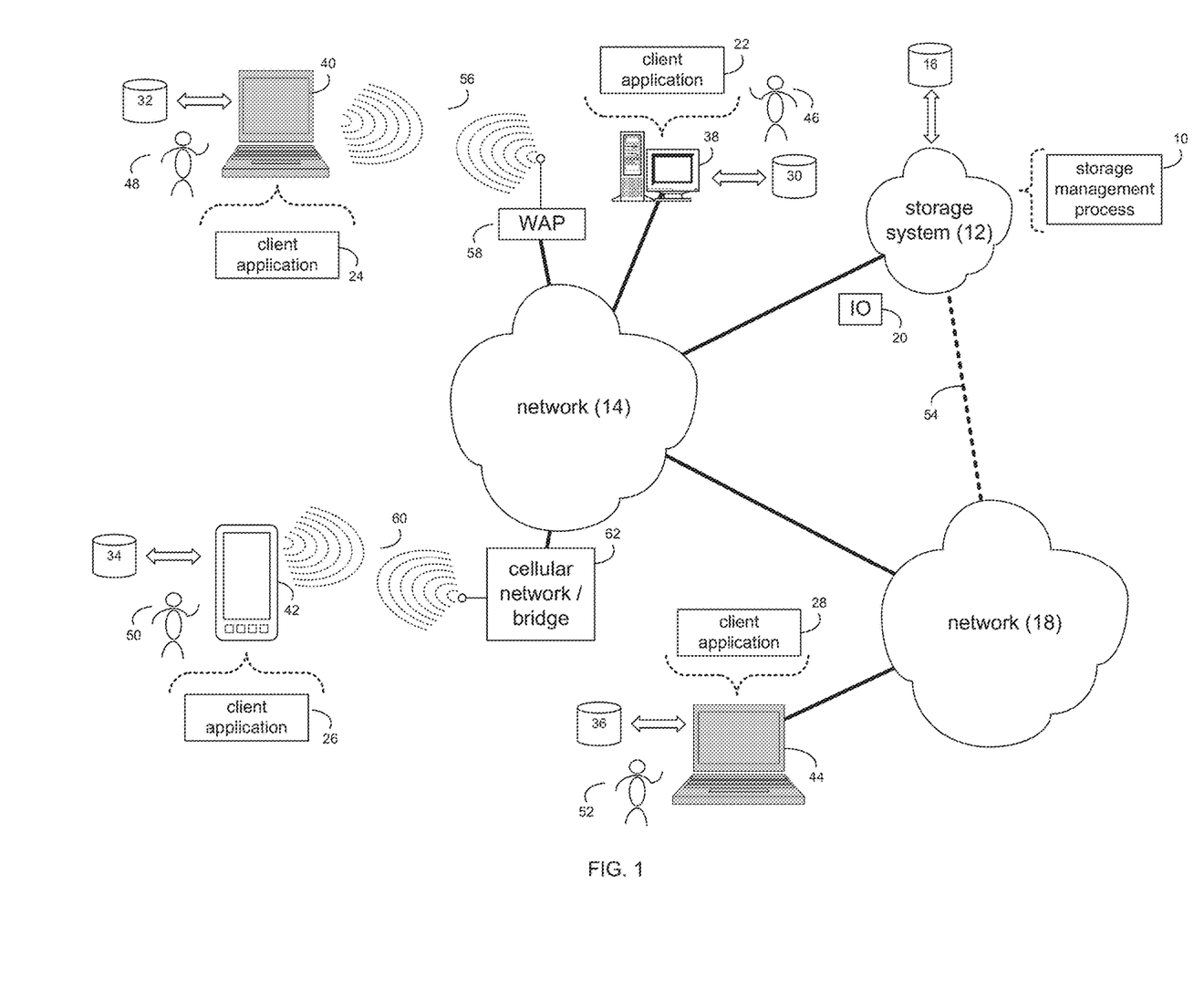
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
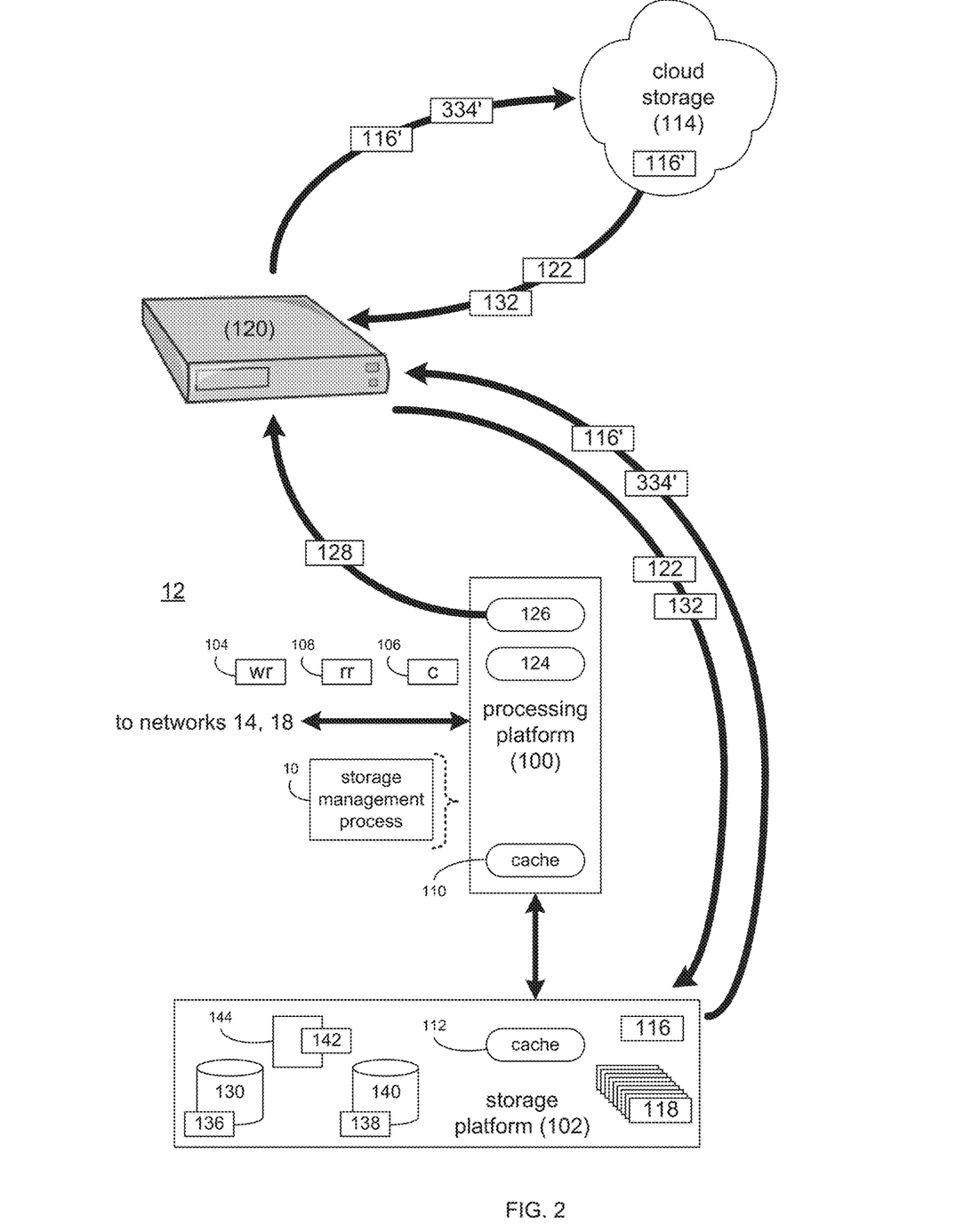
FIG. 2 is a diagrammatic view of the storage system of FIG. 1.

The Data Storage System:

Referring also to FIG. 2, there is shown a general implementation of storage system 12. In this general implementation, storage system 12 may include processing platform 100, wherein processing platform 100 may be configured to perform computational tasks and may be configured to store data within storage platform 102.

Depending on the manner in which storage system 12 is configured, storage platform 102 may include a single storage devices (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID array utilizing various standard RAID structures (e.g., RAID 0, RAID 1, RAID 3, RAID 5, RAID 6, RAID 7 or RAID 10), thus providing a higher level of performance and/or availability.

Further, storage platform 102 may be configure to offer storage that has different levels of performance. For example, storage platform 102 may be configured as a multiple tier storage system, wherein storage platform 102 may include: a higher-performance tier (e.g., one or more SSD storage devices) designed to provide a high level of performance regardless of cost per megabyte; a medium-performance tier (e.g., one or more SAS storage devices) designed to provide a moderate level of performance at a moderate cost per megabyte; and a lower-performance tier (e.g., one or more SATA storage devices) designed to provide a modest level of performance at a modest cost per megabyte.

Storage system 12 may be configured to execute all or a portion of storage management process 10. The instruction sets and subroutines of storage management process 10, which may be stored on a storage device (e.g., storage device 16) coupled to processing platform 100, may be executed by one or more processors (not shown) and one or more memory architectures (not shown) included within processing platform 100. Storage device 16 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing platform 100, content 106 to be written to storage system 12 may be processed by processing platform 100. Additionally/alternatively and when storage system 12 is configured as an application server, content 106 to be written to storage system 12 may be internally generated by processing platform 100.

Processing platform 100 may include cache memory system 110. Examples of cache memory system 110 may include but are not limited to a volatile, solid-state, cache memory system (e.g., a dynamic RAM cache memory system) and/or a non-volatile, solid-state, cache memory system (e.g., a flash-based, cache memory system). Processing platform 100 may initially store content 106 within cache memory system 110. Depending upon the manner in which cache memory system 110 is configured, processing platform 100 may immediately write content 106 to storage platform 102 (if cache memory system 110 is configured as a write-through cache) or may subsequently write content 106 to storage platform 102 (if cache memory system 110 is configured as a write-back cache).

Storage platform 102 may include cache memory system 112. Examples of cache memory system 112 may include but are not limited to a volatile, solid-state, cache memory system (e.g., a dynamic RAM cache memory system) and/or a non-volatile, solid-state, cache memory system (e.g., a flash-based, cache memory system). During operation of storage platform 102, content 106 to be written to storage platform 102 may be received from processing platform 100. Storage platform 102 may initially store content 106 within cache memory system 112 prior to being stored on e.g. the one or more of storage devices included within storage platform 102.

As discussed above, storage platform 102 may be configure to offer storage that has different levels of performance. For example, storage platform 102 may be configured as a multiple tier storage system, wherein storage platform 102 may include: a higher-performance tier (e.g., one or more SSD storage devices) designed to provide a high level of performance regardless of cost per megabyte; a medium-performance tier (e.g., one or more SAS storage devices) designed to provide a moderate level of performance at a moderate cost per megabyte; and a lower-performance tier (e.g., one or more SATA storage devices) designed to provide a modest level of performance at a modest cost per megabyte.

Additionally, storage system 12 may be configured to utilize a cloud-based storage (e.g., cloud-based data storage system 114) to offload/archive some of the data (e.g., data file 116) stored within storage system 12 (generally) and storage platform 102 (specifically) so that data that is e.g., seldomly-used may be archived to e.g., cloud-based data storage system 114.

Figure 3:
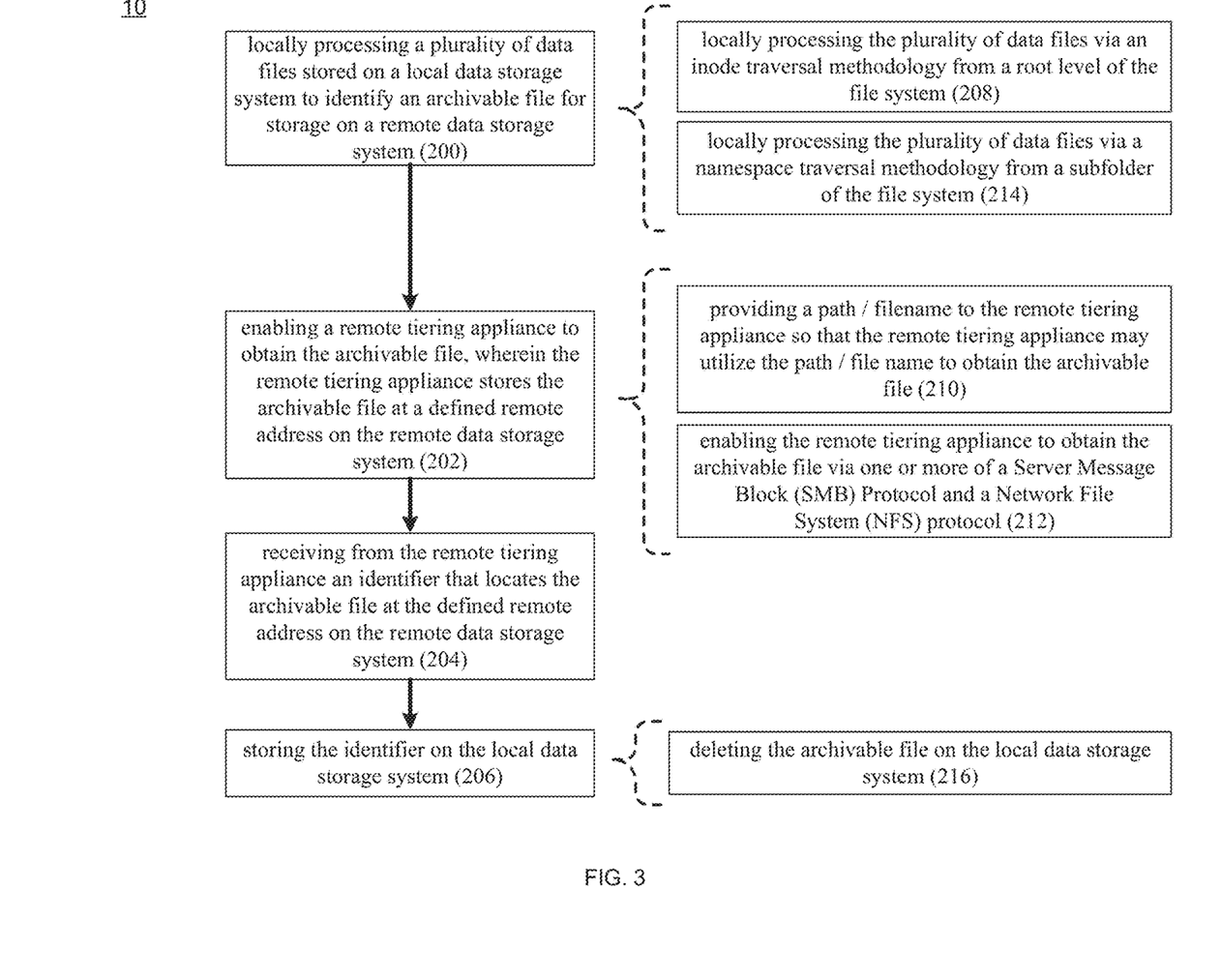
FIG. 3 is a first flow chart of the storage management process of FIG. 1.

Cloud-Based Tethering:

Referring also to FIG. 3, storage management process 10 may locally process 200 a plurality of data files (e.g., data files 118) stored on a local data storage system (e.g., storage system 12) to identify an archivable file (e.g., data file 116) for storage on a remote data storage system (e.g., cloud-based data storage system 114). Examples of cloud-based data storage system 114 may include but is not limited to: Amazon Web Services™, Microsoft Azure™, and the Google Cloud™

Storage management process 10 may enable 202 a remote tiering appliance (e.g., remote tiering appliance 120) to obtain the archivable file (e.g., data file 116). For example, remote tiering appliance 120 may obtain a copy of data file 116 (represented as data file 116'), wherein remote tiering appliance 120 may be configured to store the archivable file (e.g., data file 116') at a defined remote address (e.g., address ABC) on the remote data storage system (e.g., cloud-based data storage system 114).

Storage management process 10 may receive 204 from remote tiering appliance 120 identifier 122 (e.g., a stub) that locates the archivable file (e.g., data file 116') at the defined remote address (e.g., address ABC) on the remote data storage system (e.g., cloud-based data storage system 114).

Storage management process 10 may store 206 identifier 122 on the local data storage system (e.g., storage system 12). For example, storage management process 10 may store 206 identifier 122 at the same location (e.g., the same memory address) within local data storage system (e.g., storage system 12) as the data file that was archived was previously stored. Accordingly and in the event that a user (e.g., users 46, 48, 50, 52) of the local data storage system (e.g., storage system 12) attempts to (or wishes to) access e.g., data file 116, the identifier (e.g., identifier 122) that is stored within the local data storage system (e.g., storage system 12) may redirect the computer of the user (e.g., users 46, 48, 50, 52) to the defined remote address (e.g., address ABC) on the remote data storage system (e.g., cloud-based data storage system 114).

For example, assume that storage management process 10 is configured to routinely locally process 200 a plurality of data files (e.g., data files 118) stored on a local data storage system (e.g., storage system 12) to identify an archivable file (e.g., data file 116) for storage on a remote data storage system (e.g., cloud-based data storage system 114). The local processing may occur at various frequencies depending upon the rate at which the administrator of storage management process 10 deems appropriate. For example, this local processing may occur in real-time (e.g., continuously) or at a desired level of granularity (e.g., once per minute, once per hour, once per day, once per week or once per month).

When locally processing 200 the plurality of data files (e.g., data files 118) to determine which (if any) of these data files are archivable, each of the plurality of data files (e.g., data files 118) may be compared to the archiving policies (e.g., archiving policies 124) of the local data storage system (e.g., storage system 12) to determine which (if any) of the data files are archivable. For example, if archiving policies 124 deem a file to be archivable if the file has not be accessed for a defined period of time (e.g., a week, a month or a year), a file within data files 118 may be deemed to be archivable if it has not been accessed for a period of time equal to or greater than that period of time defined within archiving policies 124. While archiving policies 124 are discussed (in this example) to be time based, other configurations are possible and are considered to be within the scope of this disclosure. For example, archiving policies 124 may define which files are archivable based upon e.g., amount of time since the file was modified, the extension of file, or the size of the file.

Figure 4:
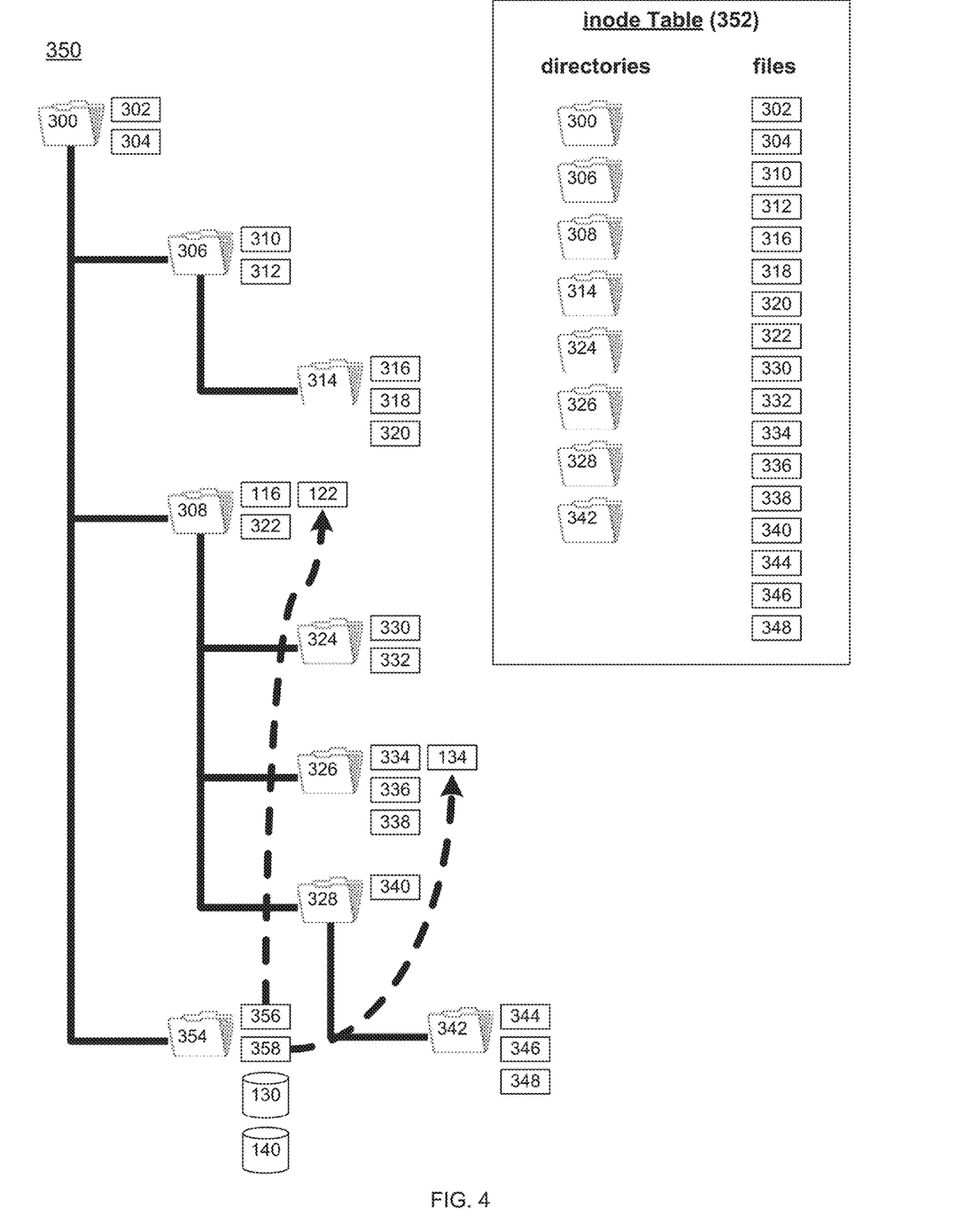
FIG. 4 is a diagrammatic view of a filesystem of the storage system of FIG. 1.

Referring also to FIG. 4, there is shown a directory structure that includes data files 118. For example, root level folder 300 may include data files 302, 304, and subfolders 306, 308. Subfolder 306 may include data files 310, 312, and subfolder 314. Subfolder 314 may include data files 316, 318, 320. Subfolder 308 may include data files 116, 322 and subfolders 324, 326, 328. Subfolder 324 may include data files 330, 332. Subfolder 326 may include data files 334, 336, 338. Subfolder 328 may include data file 340 and subfolder 342. And subfolder 342 may include data files 344, 346, 348. All of these data folders and data files may make up filesystem 350.

As is known in the art, when defining the files in a filesystem (e.g., filesystem 350) utilizing a tree-like directory structure, the location of a file is based upon the folder . . . and sub folder . . . and sub-subfolder in which it is placed. Accordingly and when identifying file 348, it may be defined as (share name)\(folder 300)\(folder 308)\(folder 328)\(folder 342)\(file 348). As can be imagined, this naming methodology may quickly become overwhelming for large directory structures.

Accordingly, storage management process 10 may utilize a more efficient identification methodology that is known as inode. As is known in the art, inode is a structure adopted by the inode of a file in the Unix Filesystem (UFS), which identifies the addresses of the data blocks of a file. This methodology has also been adopted by many users outside of the UFS environment, wherein inode allows users to describe very large files in filesystems with a fixed logical block size. Also, these blocks of addresses may only be allocated on an as-needed basis. This inode methodology not only allows for files to easily be allocated to non-contiguous blocks, but it also allows the data at a particular location inside a filesystem to be easily located since the logical block size is fixed.

Accordingly, the various data files (e.g., data files, 302, 304, 310, 312, 316, 318, 320, 322, 330, 332, 334, 336, 338, 340, 344, 346, 348) and data folders (e.g., data folders 300, 306, 308, 314, 324, 326, 328, 342) of filesystem 350 may be directly defined within inode table 352. Accordingly, storage management process 10 may generate and maintain inode table 352 that may include entries for the various objects within filesystem 350 (e.g., data files, 302, 304, 310, 312, 316, 318, 320, 322, 330, 332, 334, 336, 338, 340, 344, 346, 348 and data folders 300, 306, 308, 314, 324, 326, 328, 342). Each of these inode entries may define various pieces of data, examples of which may include but are not limited to: the type of object associated with the inode entry (e.g., data folder or data file), the date & time of creation of the object, the date & time of modification of the object, the location of blocks associated with the object, the size of the object, etc.).

Accordingly and when locally processing 200 the plurality of data files (e.g., data files 118), storage management process 10 may locally process 208 the plurality of data files (e.g., data files 118) via an inode traversal methodology from a root level (e.g., root level folder 300) of filesystem 350. For example, storage management process 10 may locally process 208 the plurality of data files (e.g., data files 118) to determine which (if any) of these data files are archivable by comparing the data defined in each of the inode entries (of inode table 352) to the archiving policies (e.g., archiving policies 124) of the local data storage system (e.g., storage system 12). Therefore, if e.g., archiving policies 124 indicate that any file that has not been accessed in more than one month be archived, storage management process 10 (when locally processing 208 data files 118) may identify any inode entries within inode table 352 that meet such criteria.

For example, assume that data file 334 has not been accessed in one month and one day. Accordingly the inode entry within inode table 352 that corresponds within data file 334 would indicate the same. Therefore, data file 334 should be archived. Storage management process 10 may then process this inode entry that corresponds to data file 334 to locate the file via a path/filename (e.g., (share name)\(folder 300)\(folder 308)\(folder 326)\(file 334).

As discussed above, storage management process 10 may then enable 202 remote tiering appliance 120 to obtain the archivable file (e.g., data file 334). When enabling 202 remote tiering appliance 120 to obtain the archivable file (data file 334), storage management process 10 may provide 210 a path/filename (e.g., (share name)\(folder 300)\(folder 308)\(folder 326)\(file 334)) to remote tiering appliance 120 so that remote tiering appliance 120 may utilize the path/file name (e.g., (share name)\(folder 300)\(folder 308)\(folder 326)\(file 334) to obtain the archivable file (data file 334). For example, storage management process 10 may place the path/filename (e.g., (share name)\(folder 300)\(folder 308)\(folder 326)\(file 334)) into a location (e.g., folder 126) that is monitored by e.g., remote tiering appliance 120. Remote tiering appliance 120 may then routinely access this location (folder 126) to see if any files need archiving (that is, if any path/filename is defined within folder 126). If so, remote tiering appliance 120 may obtain this path/file name (e.g., path/filename 128).

When enabling 202 remote tiering appliance 120 to obtain the archivable file (e.g., data file 334), storage management process 10 may enable 212 remote tiering appliance 120 to obtain the archivable file (e.g., data file 334) via one or more of a Server Message Block (SMB) Protocol and a Network Filesystem (NFS) protocol (which are commonly-used network protocols). Remote tiering appliance 120 may then obtain a copy of data file 334 (represented as data file 334'), wherein remote tiering appliance 120 may be configured to store the archivable file (e.g., data file 334') at a defined remote address (e.g., address DEF) on the remote data storage system (e.g., cloud-based data storage system 114).

While the above-described inode traversal methodology is highly efficient, there are times when it may be beneficial to use other methodologies. For example and when locally processing 200 a plurality of data files (e.g., data files 118), storage management process 10 may locally process 214 the plurality of data files (e.g., data files 118) via a namespace traversal methodology from a subfolder of filesystem 350. Accordingly and in the event that filesystem 350 in its entirety (e.g., beginning at root level folder 300) is not being processed for archiving and only a portion of filesystem 350 beginning at a subfolder (e.g., subfolder 328) is being processed, storage management process 10 may locally process 214 the plurality of data files (e.g., data files 118) via a namespace traversal methodology from subfolder 328. Accordingly and when locally processing 214 the plurality of data files (e.g., data files 118) via a namespace traversal methodology, storage management process may e.g., access subfolder 328, may examine all of the data files (e.g., data file 340) included within subfolder 328, may then access subfolder 342, and may examine all of the data files (e.g., data files 344, 346, 348) included within subfolder 342.

In the event that archivable files are found (e.g., data file 340 within subfolder 328) via this namespace traversal methodology, storage management process 10 may provide 210 a path/filename (e.g., (share name)\(folder 300)\(folder 308)\(folder 328)\(file 340)) to remote tiering appliance 120 so that remote tiering appliance 120 may utilize the path/file name (e.g., (share name)\(folder 300)\(folder 308)\(folder 328)\(file 340)) to obtain the archivable file (e.g., data file 340). As discussed above, storage management process 10 may place the path/filename (e.g., (share name)\(folder 300)\(folder 308)\(folder 328)\(file 340)) into a location (e.g., folder 126) that is monitored by e.g., remote tiering appliance 120, wherein remote tiering appliance 120 may routinely access this location (folder 126) to see if any files need archiving (that is, if any path/filename is defined within folder 126).

As discussed above, remote tiering appliance 120 may be configured to store the archivable file at a defined remote address on the remote data storage system (e.g., cloud-based data storage system 114) and storage management process 10 may receive 204 from remote tiering appliance 120 an identifier (e.g., identifier 122) that locates the archivable file at the defined remote address on the remote data storage system (e.g., cloud-based data storage system 114).

As discussed above, storage management process 10 may store 206 identifier 122 on the local data storage system (e.g., storage system 12), wherein storage management process 10 may store identifier 122 at the same location (e.g., the same memory address) within local data storage system (e.g., storage system 12) as the data file that was archived was previously stored. When storing 206 the identifier on the local data storage system, storage management process 10 may delete 216 the archivable file on the local data storage system (e.g., storage system 12). Accordingly and in the event that a user (e.g., users 46, 48, 50, 52) of the local data storage system (e.g., storage system 12) attempts to (or wishes to) access the data file that was archived, the identifier (e.g., identifier 122) that is stored within the local data storage system (e.g., storage system 12) may redirect the computer of the user (e.g., users 46, 48, 50, 52) to the defined remote address on the remote data storage system (e.g., cloud-based data storage system 114).

Figure 5:
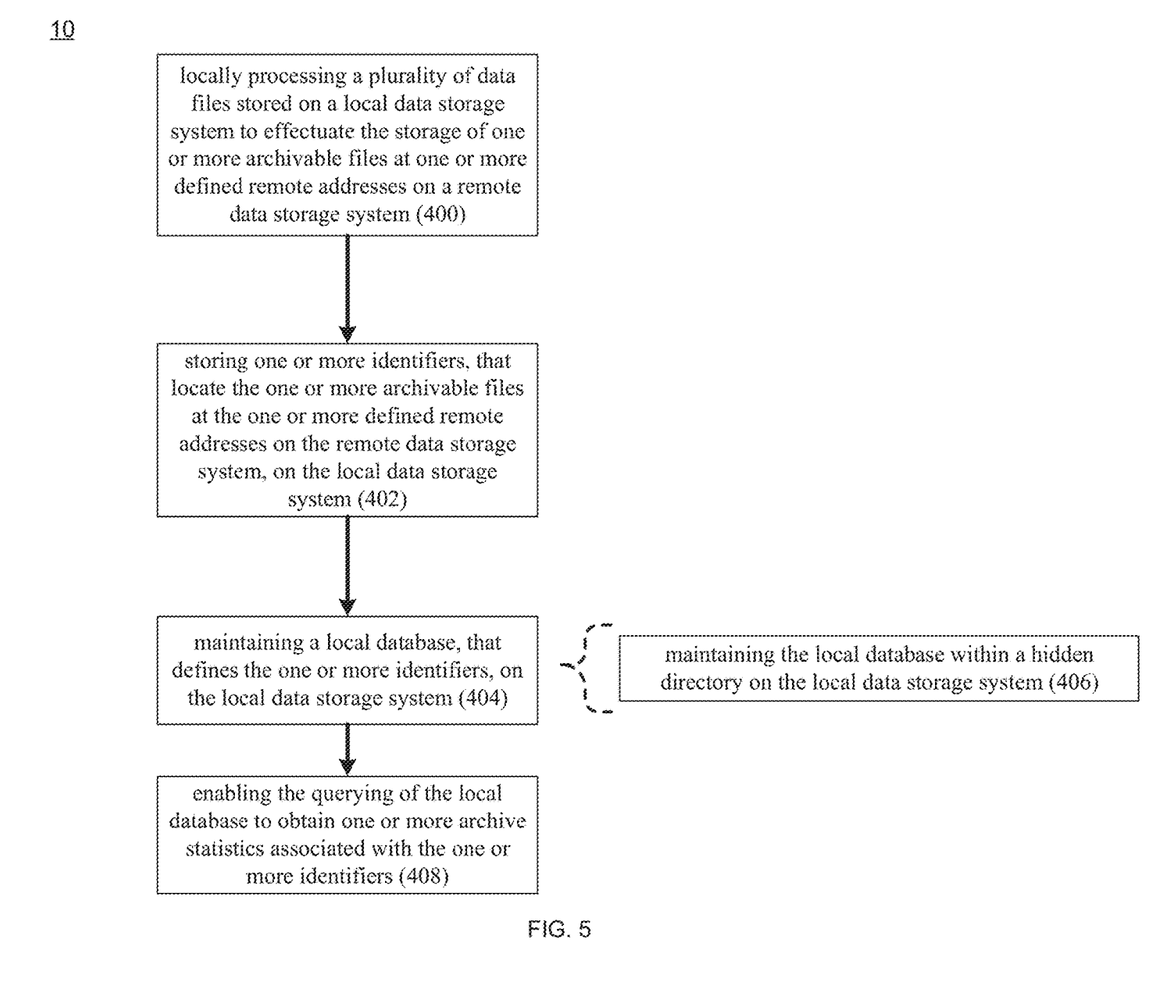
FIG. 5 is a second flow chart of the storage management process of FIG. 1.

Local Identifier Database:

Referring also to FIG. 5 and as discussed above, storage management process 10 may locally process 400 a plurality of data files (e.g., data files 118) stored on a local data storage system (e.g., storage system 12) to effectuate the storage of one or more archivable files (e.g., data files 116', 334') at one or more defined remote addresses (e.g., addresses ABC, DEF, respectively) on a remote data storage system (e.g., cloud-based data storage system 114). Storage management process 10 may store 402 one or more identifiers that may locate the one or more archivable files (e.g., data files 116', 334') at the one or more defined remote addresses (e.g., addresses ABC, DEF, respectively) on the remote data storage system (e.g., cloud-based data storage system 114), on the local data storage system (e.g., storage system 12).

Storage management process 10 may maintain 404 a local database (e.g., local database 130) on the local data storage system (e.g., storage system 12), wherein local database 130 may define the one or more identifiers. When maintaining 404 local database 130 on the local data storage system (e.g., storage system 12), storage management process 10 may maintain 406 local database 130 within a hidden directory (e.g., hidden directory 354) on the local data storage system (e.g., storage system 12). By positioning local database 130 within hidden directory 354, local database 130 may be protected from accidental or intentional manipulation or damage.

Local database 130 may be configured to define every identifier stored within the local data storage system (e.g., storage system 12). Continuing with the above-stated example, assume that storage management process 10 locally processed 400 data files 118 and determined that data files 116, 334 may be archived. Accordingly, the remote tiering appliance (e.g., remote tiering appliance 120) may store the archivable files (e.g., data files 116, 334) at remote addresses (e.g., addresses ABC, DEF respectfully) on the remote data storage system (e.g., cloud-based data storage system 114). Storage management process 10 may then receive: identifier 122 (that locates data file 116' at address ABC on cloud-based data storage system 114) and identifier 132 (that locates data file 334 at address DEF on cloud-based data storage system 114). Storage management process 10 may then store 402 identifiers 122, 134 on the local data storage system (e.g., storage system 12), wherein identifiers 122, 134 may locate data files 116', 334' (respectively) at addresses ABC, DEF (respectively) on the remote data storage system (e.g., cloud-based data storage system 114).

As discussed above, storage management process 10 may store each of identifiers 122, 134 at the same location (e.g., the same memory address) within the local data storage system (e.g., storage system 12) as the data file (that was archived) was previously stored. Accordingly, identifier 122 may be stored at the same memory address (within storage system 12) as the archived data file (e.g., data file 116) was previously stored. For illustrative purposes, identifier 122 is shown being stored within subfolder 308 (the previous location of archived data file 116). Further, identifier 134 may be stored at the same memory address (within storage system 12) as the archived data file (e.g., data file 334) was previously stored. For illustrative purposes, identifier 134 is shown being stored within subfolder 326 (the previous location of archived data file 334).

As discussed above, local database 130 may be configured to define the one or more identifiers (e.g., identifiers 122, 134) stored within the local data storage system (e.g., storage system 12). Further, local database 130 may include/maintain one or more archive statistics (e.g., archive statistics 136) that may be associated with the one or more identifiers (e.g., identifiers 122, 134). Examples of these archive statistics (e.g., archive statistics 136) may include but are not limited to one or more of: a total archived file count (e.g., the number of data files that were archived onto cloud-based data storage system 114); a total archived file size (e.g., the quantity of data that was archived onto cloud-based data storage system 114); a total archived file percentage (e.g., the percentage of data files that were archived onto cloud-based data storage system 114); one or more archive usage statistics (e.g., usage statistics concerning one or more data files that are archived within cloud-based data storage system 114); and one or more archive availability statistics (e.g., the percentage of archive storage space available within cloud-based data storage system 114).

Storage management process 10 may be configured to enable 408 the querying of local database 130 to obtain one or more of the archive statistics (e.g., archive statistics 136) associated with the one or more identifiers (e.g., identifiers 122, 134). Accordingly, the users (e.g., users 46, 48, 50, 52) of storage system 12 may use storage management system 10 to query of local database 130 to determine (for example): a) the number of data files that were archived onto cloud-based data storage system 114; b) the quantity of data that was archived onto cloud-based data storage system 114; c) the percentage of data files that were archived onto cloud-based data storage system 114; d) usage statistics concerning one or more data files that are archived within cloud-based data storage system 114; and e) the percentage of archive storage space available within cloud-based data storage system 114).

Hidden directory 354 on the local data storage system (e.g., storage system 12) may be configured to include one or more hard links (e.g., hard links 356, 358) associated with the one or more identifiers (e.g., identifiers 122, 134). Specifically, hard link 356 is shown to be associated with identifier 122 and hard link 358 is shown to be associated with identifier 134.

As is known in the art, a hard link is a directory entry that associates a name with a file on a filesystem (e.g., filesystem 350). All directory-based filesystems (e.g., filesystem 350) have at least one hard link giving the original name for each file. The term "hard link" is typically only used in filesystems that allow more than one hard link for the same file. Creating a hard link has the same effect as giving one file multiple identities (e.g. different names in different directories), wherein all of these identities independently connect to the same data on the storage system. Accordingly, hard links may cause an alias effect, wherein e.g. if the file is opened by any one of its identities and changes are made to its content, these changes will also be visible when the file is opened by an alternative identity.

As discussed above, storage management process 10 may store each of identifiers 122, 134 at the same location (e.g., the same memory address) within the local data storage system (e.g., storage system 12) as the data file (that was archived) was previously stored. Accordingly, identifier 122 may be located and accessed via a path/filename (e.g., (share name)\(folder 300)\(folder 308)\(identifier 122)). Further, hard link 356 may be an alternative identity for identifier 122, wherein selecting hard link 356 will have the same cause and effect as selecting identifier 122, as e.g., hard link 356 and the path/filename (e.g., (share name)\(folder 300)\(folder 308)\(identifier 122)) are both linked to the same underlying piece of data. Further, identifier 134 may be located and accessed via a path/filename (e.g., (share name)\(folder 300)\(folder 308)\(folder 326)\(identifier 134)). Further, hard link 358 may be an alternative identity for identifier 134, wherein selecting hard link 358 will have the same cause and effect as selecting identifier 134, as e.g., hard link 358 and the path/filename (e.g., (share name)\(folder 300)\(folder 308)\(folder 326)\(identifier 134)) are both linked to the same underlying piece of data.

Further, each time that a new identifier is stored within filesystem 350, a new hard link with be generated and stored within hidden directory 354. Accordingly, hidden directory 354 (and the various hard links stored therein) may function as a identifier repository that may allow storage management process 10 to quickly and easily quantify all of the identifiers currently being stored within filesystem 350 and local data storage system (e.g., storage system 12). Therefore, in the event that storage system 10 needs to determine what identifiers are currently stored within filesystem 350 and local data storage system (e.g., storage system 12), storage system 10 may only need to scan hidden directory 354, as opposed to need to crawl/spider the entirety of filesystem 350.

Orphan Management

Figure 6:
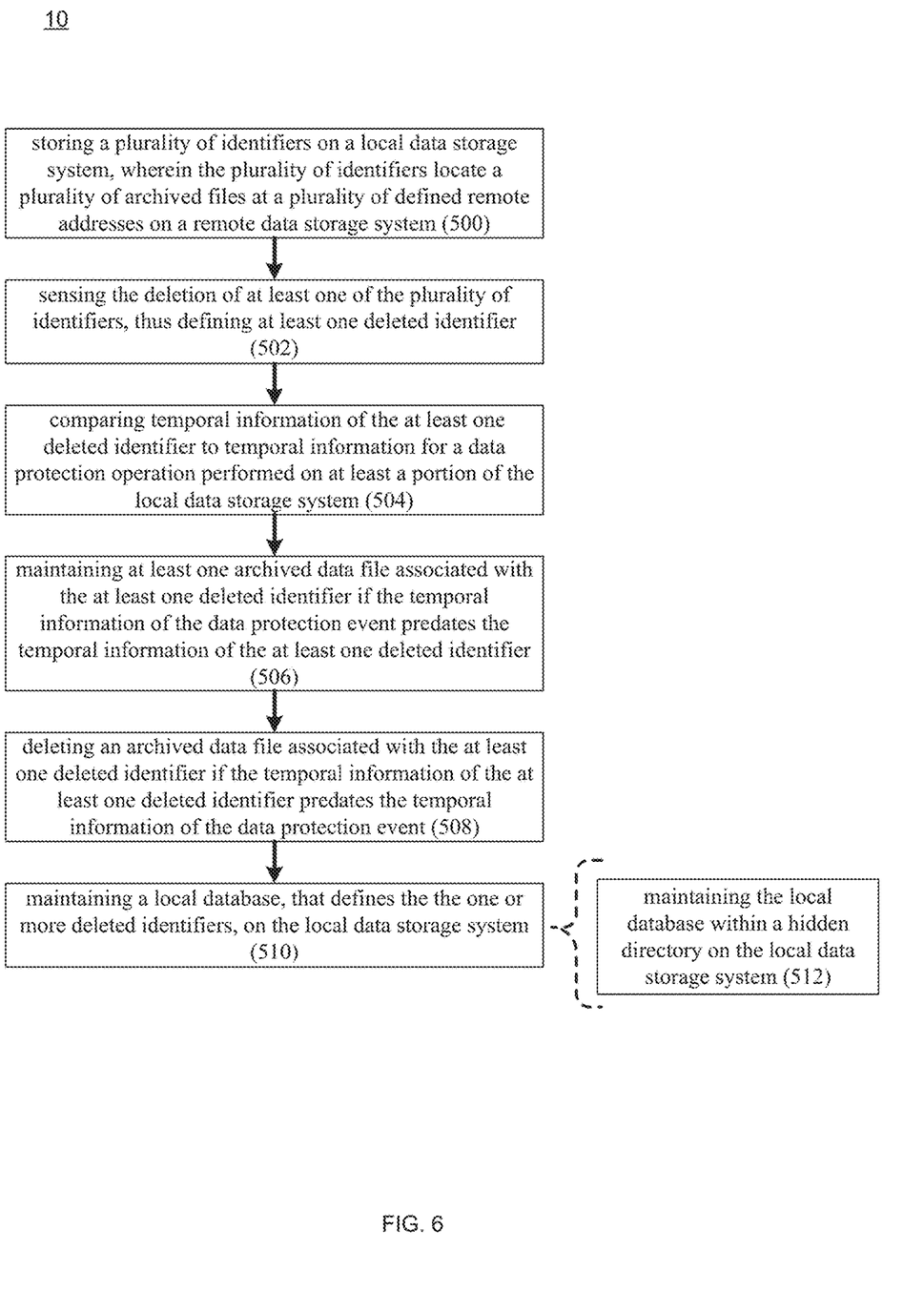
FIG. 6 is a third flow chart of the storage management process of FIG. 1.

Referring also to FIG. 6 and as discussed above, storage management process 10 may store 500 a plurality of identifiers (e.g., identifiers 122, 134) on a local data storage system (e.g., storage system 12). The plurality of identifiers (e.g., identifiers 122, 134) may locate a plurality of archived files (e.g., data files 116', 334') at a plurality of defined remote addresses (e.g., addresses ABC, DEF respectfully) on a remote data storage system (e.g., cloud-based data storage system 114).

During the operation of storage management system 10, the users (e.g., users 46, 48, 50, 52) of storage system 12 may access, modify and/or save one of more of data files 116, 334. During times when data files 116, 334 are archived (e.g., archived data files 116', 334' are remotely-stored on cloud-based data storage system 114), the corresponding locally-stored identifiers (e.g., identifiers 122, 134) may appear to be data files 116, 334 to the users (e.g., users 46, 48, 50, 52) of storage system 12.

Accordingly and in the event that one or more of the users (e.g., users 46, 48, 50, 52) of storage system 12 wishes to delete data files 116, 334 during a time when these data files are archived on cloud-based data storage system 114, the user (e.g., users 46, 48, 50, 52) of storage system 12 may simply delete identifiers 122, 134, as identifiers 122, 134 will appear (to users 46, 48, 50, 52) to be data files 116, 334. When such a deletion of an identifier occurs, an orphan file is created (i.e., an archived file that is stored on cloud-based data storage system 114 but is not associated with an identifier on the local data storage system (e.g., storage system 12).

For the following example, assume that user 46 wishes to delete data file 116. As identifier 122 will appear to user 46 to be data file 116, user 46 may delete identifier 122 as if they were deleting data file 116. Since the deletion of identifier 122 will not result in the deletion of the actual archived file (e.g., archived file 116') stored on the remote data storage system (e.g., cloud-based data storage system 114), archived file 116' will become an orphaned file, since archived file 116' is no longer associated with an identifier (e.g., identifier 122) on the local data storage system (e.g., storage system 12). Further, metadata associated with the deleted identifier (e.g., identifier 122) may be updated to include temporal data (i.e., time & date of deletion information) concerning the identifier deletion, thus forming deleted identifier temporal information 138, which may be stored on local database 140.

Continuing with the above-stated example, storage management process 10 may sense 502 the deletion of identifier 122 (thus defining at least one deleted identifier) and may compare 504 deleted identifier temporal information 138 to temporal information (e.g., data protection operation temporal information 142) for a data protection operation performed on at least a portion of the local data storage system (e.g., storage system 12). For example and during the operation of storage system 12, storage system 12 may execute one or more data protection operations, example of which may include but are not limited to: a snapshot operation, a replication operation, a backup operation and a mirroring operation. When one of these data protection operations occurs, metadata associated with the data protection operation may be updated to include temporal data (i.e., time & date of operation information) concerning the data protection event, thus forming data protection operation temporal information 142.

As is known in the art, one or more of these data protection operations may be configured to allow a portion of storage platform 102 (e.g., filesystem 350) to be restored to what it was at a particular point in time (e.g., the point in time at which the data protection operation was executed). For example and as is known in the art, when a snapshot operation is performed on all (or a portion of) a filesystem (e.g., filesystem 350), a group of pointers (not shown) are defined within the snapshot that identify (i.e., point to) the appropriate version of all of the files that were stored on e.g., filesystem 350 at the time that the snapshot was made. For example, if filesystem 350 included ten files at the time that a snapshot was made, this snapshot would define ten pointers that locate the ten files that were in filesystem 350 at the time that the snapshot was made. In the event that files are subsequently added/deleted/modified and then additional snapshots are taken, the pointers within the additional snapshots may be added/deleted/modified to reflect the changes to the files added/deleted/modified within filesystem 350.

Additionally and regardless of the adding/deleting/modifying of the files within filesystem 350, as long as all of the files that are identified by the pointers within a snapshot are maintained, the snapshot may allow the filesystem may be restored to what is was at the point in time at which the snapshot was taken. And (unfortunately) in the event that one or more of the files that are identified by the pointers within a snapshot are no longer available, the snapshot may no longer allow the filesystem to be restored to what it was at the point in time at which the snapshot was taken. Accordingly and in order to ensure that a snapshot is capable of restoring a filesystem at some future date, any data files that are identified within the snapshot in question need to be maintained.

As discussed above, storage management process 10 may sense 502 the deletion of (in this example) identifier 122 and may compare 504 deleted identifier temporal information 138 (for identifier 122) to data protection operation temporal information 142 (for a data protection operation performed). Accordingly and when comparing 504 deleted identifier temporal information 138 to data protection operation temporal information 142, storage management system 10 may determine which of these two pieces of temporal data predates the other.

For example, assume that at Time A, identifier 122 is deleted by storage management system 10. Further assume that at Time B, a snapshot (e.g., snapshot 144) of filesystem 350 is generated. Accordingly and depending upon the sequencing of Time A versus Time B, the deleted identifier (i.e., identifier 122) may (or may not) be identified by one of the above-described pointers included within snapshot 144. Accordingly, storage management system 10 may determine which event (i.e., the deletion of identifier 122 or the generation of snapshot 144) occurred first.

Accordingly, storage management process 10 may maintain 506 at least one archived data file (e.g., archived file 116') associated with the at least one deleted identifier (e.g., identifier 122) if the temporal information of the data protection event (e.g., data protection operation temporal information 142) predates the temporal information of the at least one deleted identifier (e.g., deleted identifier temporal information 138). Specifically, if Time B (i.e., the date & time at which snapshot 144 was generated) predates Time A (i.e., the date & time at which identifier 122 was deleted), storage management process 10 may maintain 506 (in this example) archived file 116' associated with the deleted identifier (e.g., identifier 122) because the deleted identifier (i.e., identifier 122) may be identified by one of the above-described pointers included within snapshot 144. Accordingly, archived file 116' may be needed to restore filesystem 350 based upon snapshot 144 at a future date. Therefore, storage management process 10 may e.g., instruct remote tiering appliance 120 to maintain 506 archived file 116' associated with the deleted identifier 122.

Conversely, storage management process 10 may delete 508 an archived data file (e.g., archived file 116') associated with the at least one deleted identifier (e.g., identifier 122) if the temporal information of the at least one deleted identifier (e.g., deleted identifier temporal information 138) predates the temporal information of the data protection event (e.g., data protection operation temporal information 142). Specifically, if Time A (i.e., the date & time at which identifier 122 was deleted) predates Time B (i.e., the date & time at which snapshot 144 was generated), storage management process 10 may delete 508 (in this example) archived file 116' associated with the deleted identifier (e.g., identifier 122) because the deleted identifier (i.e., identifier 122) may not be identified by one of the above-described pointers included within snapshot 144. Accordingly, archived file 116' may not be needed to restore filesystem 350 based upon snapshot 144 at a future date. Therefore, storage management process 10 may instruct remote tiering appliance 120 to delete 508 archived file 116' associated with the deleted identifier 122

As discussed above, deleted identifier temporal information 138 may be stored on local database 140. Storage management process 10 may maintain 510 local database 140, wherein local database 140 may reside on the local data storage system (e.g., storage system 12) and may define the at least one deleted identifier (e.g., identifier 122). In a fashion similar to that of local database 130 (which defines the identifiers present within filesystem 350), local database 140 may be configured to define the identifiers that were deleted from filesystem 350. Further and in a fashion similar to that of local database 130, when maintaining 510 local database 140, storage management process 10 may maintain 512 local database 140 within a hidden directory (e.g., hidden directory 354) on the local data storage system (e.g., storage system 12). By positioning local database 140 within hidden directory 354, local database 140 may be protected from accidental or intentional manipulation or damage.

As mentioned above, local database 140 may be configured to define the identifiers that were deleted from the local data storage system (e.g., storage system 12). Accordingly and when identifier 122 was deleted for the reasons described above, local database 140 may be updated to include an entry for identifier 122 that defines e.g., deleted identifier temporal information 138.

As discussed above, hidden directory 354 on the local data storage system (e.g., storage system 12) may be configured to include one or more hard links associated with the identifiers present within filesystem 350. Further, hidden directory 354 on the local data storage system (e.g., storage system 12) may be configured to include one or more hard links associated with the at least one deleted identifier (e.g., identifier 122).

For example, all of the hard links that are associated with identifiers present within filesystem 350 may be stored in a "present" subfolder within hidden directory 354, while all of the hard links that are associated with identifiers deleted from filesystem 350 may be stored in a "deleted" subfolder within hidden directory 354. Accordingly, each time that an identifier is deleted within filesystem 350, a new hard link will be generated and stored within the "deleted" subfolder of hidden directory 354. Further, the "deleted" subfolder within hidden directory 354 (and the various hard links stored therein) may function as a deleted identifier repository that may allow storage management process 10 to quickly and easily quantify all of the identifiers that have been deleted from filesystem 350 and the local data storage system (e.g., storage system 12). Therefore, in the event that storage system 10 needs to determine what identifiers were deleted from filesystem 350 and local data storage system (e.g., storage system 12), storage system 10 may only need to scan the "deleted" folder of hidden directory 354. As these hard links to these deleted identifiers (e.g., identifier 122) are stored within a subfolder of hidden directory 354, these hard links are not accessible to e.g., users 46, 48, 50, 52. Accordingly, as long as the traditional path/filename associated with the deleted identifier (e.g., deleted identifier 122) is removed from the namespace of filesystem 350, the deleted identifier (e.g., deleted identifier 122) will be inaccessible to e.g., users 46, 48, 50, 52 and (therefore) will appear to be deleted even though it is still accessible via hard links within hidden directory 354.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
    storing a plurality of identifiers on a local data storage system, wherein the plurality of identifiers locate a plurality of archived files at a plurality of defined remote addresses on a remote data storage system;
    sensing the deletion of at least one of the plurality of identifiers, thus defining at least one deleted identifier;
    generating, and storing in a hidden directory, one or more hard links associated with the at least one deleted identifier each time an identifier of the plurality of identifiers is deleted;
    comparing temporal information of the at least one deleted identifier to temporal information for a data protection operation performed on at least a portion of the local data storage system to effectuate determining which of the temporal information, of the at least one deleted identifier and of the data protection operation performed on at least a portion of the local data storage system, predate the other, wherein the data protection operation includes at least one of a snapshot operation, a replication operation, a backup operation, and a mirroring operation;
    in response to determining the temporal information of the at least one deleted identifier predates the temporal information of the data protection event, deleting an archived data file associated with the at least one deleted identifier; and
    in response to determining the temporal information of the data protection event predates the temporal information of the at least one deleted identifier, maintaining at least one archived data file associated with the at least one deleted identifier.

2. The computer-implemented method of claim 1 further comprising:
    maintaining a local database, that defines the at least one deleted identifier, on the local data storage system.

3. The computer-implemented method of claim 2 wherein maintaining the local database, that defines the at least one deleted identifier, on the local data storage system includes:
    maintaining the local database within the hidden directory on the local data storage system.

4. The computer-implemented method of claim 3 wherein the hidden directory on the local data storage system is configured to include the one or more hard links associated with the at least one deleted identifier.

5. The computer-implemented method of claim 1 wherein the remote data storage system is a cloud-based data storage system.

6. A computer program product residing on a non-transitory computer readable medium having a plurality of instructions stored thereon which, when executed by a processor, cause the processor to perform operations comprising:
    storing a plurality of identifiers on a local data storage system, wherein the plurality of identifiers locate a plurality of archived files at a plurality of defined remote addresses on a remote data storage system;
    sensing the deletion of at least one of the plurality of identifiers, thus defining at least one deleted identifier;
    generating, and storing in a hidden directory, one or more hard links associated with the at least one deleted identifier each time an identifier of the plurality of identifiers is deleted;
    comparing temporal information of the at least one deleted identifier to temporal information for a data protection operation performed on at least a portion of the local data storage system to effectuate determining which of the temporal information, of the at least one deleted identifier and of the data protection operation performed on at least a portion of the local data storage system, predate the other, wherein the data protection operation includes at least one of a snapshot operation, a replication operation, a backup operation, and a mirroring operation;
    in response to determining the temporal information of the at least one deleted identifier predates the temporal information of the data protection event, deleting an archived data file associated with the at least one deleted identifier; and
    in response to determining the temporal information of the data protection event predates the temporal information of the at least one deleted identifier, maintaining at least one archived data file associated with the at least one deleted identifier.

7. The computer program product of claim 6 further comprising:
    maintaining a local database, that defines the at least one deleted identifier, on the local data storage system.

8. The computer program product of claim 7 wherein maintaining the local database, that defines the at least one deleted identifier, on the local data storage system includes:
    maintaining the local database within the hidden directory on the local data storage system.

9. The computer program product of claim 8 wherein the hidden directory on the local data storage system is configured to include the one or more hard links associated with the at least one deleted identifier.

10. The computer program product of claim 6 wherein the remote data storage system is a cloud-based data storage system.

11. A computing system comprising:
    a memory; and
    one or more processors configured for:
        storing a plurality of identifiers on a local data storage system, wherein the plurality of identifiers locate a plurality of archived files at a plurality of defined remote addresses on a remote data storage system;

sensing the deletion of at least one of the plurality of identifiers, thus defining at least one deleted identifier;

generating, and storing in a hidden directory, one or more hard links associated with the at least one deleted identifier each time an identifier of the plurality of identifiers is deleted;

comparing temporal information of the at least one deleted identifier to temporal information for a data protection operation performed on at least a portion of the local data storage system to effectuate determining which of the temporal information, of the at least one deleted identifier and of the data protection operation performed on at least a portion of the local data storage system, predate the other, wherein the data protection operation includes at least one of a snapshot operation, a replication operation, a backup operation, and a mirroring operation;

in response to determining the temporal information of the at least one deleted identifier predates the temporal information of the data protection event, deleting an archived data file associated with the at least one deleted identifier; and in response to determining the temporal information of the data protection event predates the temporal information of the at least one deleted identifier, maintaining at least one archived data file associated with the at least one deleted identifier.

12. The computing system of claim 11 further comprising:
maintaining a local database, that defines the at least one deleted identifier, on the local data storage system.

13. The computing system of claim 12 wherein maintaining the local database, that defines the at least one deleted identifier, on the local data storage system includes:
maintaining the local database within the hidden directory on the local data storage system.

14. The computing system of claim 13 wherein the hidden directory on the local data storage system is configured to include the one or more hard links associated with the at least one deleted identifier.

15. The computing system of claim 11 wherein the remote data storage system is a cloud-based data storage system.

* * * * *